(12) United States Patent
Stahl et al.

(10) Patent No.: US 11,459,187 B2
(45) Date of Patent: Oct. 4, 2022

(54) METHOD AND DEVICE FOR ALIGNING RECTANGULAR PACKAGING BOXES

(71) Applicant: Uhlmann Pac-Systeme GmbH & Co. KG, Laupheim (DE)

(72) Inventors: Joachim Stahl, Neu-Ulm (DE); Michael Knoll, Achstetten (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 309 days.

(21) Appl. No.: 16/579,072

(22) Filed: Sep. 23, 2019

(65) Prior Publication Data
US 2020/0095068 A1 Mar. 26, 2020

(30) Foreign Application Priority Data

Sep. 24, 2018 (EP) .................................... 18196273

(51) Int. Cl.
*B65G 47/28* (2006.01)
*B65G 47/88* (2006.01)
(52) U.S. Cl.
CPC .................................. *B65G 47/28* (2013.01)
(58) Field of Classification Search
None
See application file for complete search history.

(56) References Cited

U.S. PATENT DOCUMENTS

| | | | |
|---|---|---|---|
| 5,111,633 A | 5/1992 | Draghetti | |
| 5,501,318 A * | 3/1996 | Disrud | B65G 47/841 198/732 |
| 6,878,222 B1 | 4/2005 | Os | |
| 7,726,461 B2 * | 6/2010 | Risley | B65G 47/31 198/370.02 |
| 8,109,384 B2 * | 2/2012 | Pressler | B65G 47/8823 198/459.7 |
| 9,079,724 B2 * | 7/2015 | van de Loecht | B65G 47/31 |
| 2003/0024217 A1 | 2/2003 | Schwede et al. | |

FOREIGN PATENT DOCUMENTS

| | | |
|---|---|---|
| CN | 103171784 A | 6/2013 |
| CN | 204150651 U | 2/2015 |
| DE | 4040261 A1 | 12/1990 |

(Continued)

OTHER PUBLICATIONS

International Search Report dated Feb. 28, 2019.
European Office Action dated Oct. 6, 2021.

*Primary Examiner* — Kavel Singh
(74) *Attorney, Agent, or Firm* — Dickinson Wright PLLC (57) ABSTRACT

A method for aligning rectangular packaging boxes comprises the steps of conveying packaging boxes along a transport path and of aligning each packaging box by means of at least one stop element. The step of aligning a packaging box comprises the steps of positioning the at least one stop element in a first position, in which it projects into the transport path; conveying the packaging box against the at least one stop element until each section of the packaging box facing the at least one stop element is resting against it; and moving the at least one stop element into a second position, in which it does not project into the transport path and thus releases the aligned packaging box for further transport.

16 Claims, 8 Drawing Sheets

(56) References Cited

FOREIGN PATENT DOCUMENTS

| | | |
|---|---|---|
| GB | 934866 A | 8/1963 |
| JP | S6024706 A | 2/1985 |
| JP | 2000255517 A | 9/2000 |
| JP | 2006290385 A | 10/2006 |
| WO | WO9503220 | 2/1995 |

* cited by examiner

METHOD AND DEVICE FOR ALIGNING RECTANGULAR PACKAGING BOXES

CROSS-REFERENCE TO RELATED APPLICATIONS

This application claims the benefit of priority under 35 U.S.C. § 119 to European Patent Application No. 18 196 273.9, filed Sep. 24, 2018, the contents of which are incorporated herein by reference in their entirety.

FIELD

The present disclosure relates to a method and device for aligning rectangular packaging boxes, in particular folding boxes containing pharmaceutical products.

Packaging boxes are frequently used as outer packaging for pharmaceutical products packaged in smaller units. For example, a plurality of blister packs, each containing one or more tablets, is packaged together with an insert into a packaging box. A packaging line suitable for this purpose usually comprises a blister machine for producing and filling blister packs; a cartoning machine, which packs the blister packs into packaging boxes; and optionally further machines downstream thereof, such as a labeling machine, a serializing machine, a printer, an embossing machine, or a combination of these.

The packaging boxes then pass along a delivery chain from the manufacturer of the pharmaceutical products to the end user. Various types of identification marks may be applied to the packaging boxes in the labeling and/or serializing machine, so that the packages can be tracked individually over the course of their delivery chain and the contents of the packaging boxes are protected from undesired manipulation. One example of such identification mark is an adhesive label, which gives information on the contents or route of administration. Individual identifiers such as barcodes or QR codes can also be applied to the packaging boxes by means of lasers or printers, for example. Individual identification marks or identifiers make it possible to track individual packaging boxes from the pharmaceutical manufacturer along the entire distribution chain to the end user. This guarantees the traceability of the pharmaceutical products and thus ensures the quality and origin of the products.

In addition to traceability, so-called tamper-evident packaging also plays an important role. Such tamper-evident packages comprise one or more security features and are irreversibly damaged the first time the packaging box is opened. It is therefore always obvious whether the box is in its original state or has already been opened before. This is intended to prevent packaging boxes which have already been filled and labeled from being tampered with, i.e., to prevent them from being reopened and the pharmaceutical products in them from being replaced by other products. Tamper-evident features of this type can be configured as an integral part of the packaging box or can be formed by separate means, such as adhesive labels. Suitable adhesive labels therefore extend from a first side of the packaging box over and around an edge of the box to a second side of the box, wherein one of the two sides is formed by an openable bottom or top flap of the box. The adhesive label adheres so strongly to the box that it cannot be removed without damaging at least the box or the adhesive label. If the bottom or top flap of the packaging box is opened to access the medicinal product therein, the adhesive label or the box itself will necessarily be damaged.

In particular with this type of label, which extends over and around at least one edge of the packaging box, but also with all other types of identifiers which can be applied to a packaging box, we have found it is necessary that the boxes are aligned as perfectly as possible when the label or identifier is to be applied. Only if the sides of a rectangular packaging box are perpendicular to each other, it is guaranteed that the labels will be applied to the desired location on each of a plurality of boxes and that the labels will not form folds or be damaged during the application process itself, particularly when they extend around the edges of the box.

We have found, however, that, because of the required ways of conveying the products within the individual machines of a packaging line and particularly at the interface between a cartoning machine and a labeling and/or serializing machine, it is hardly possible to transport or transfer the packaging boxes in such a way that they retain their shape.

BACKGROUND

The present disclosure provides a method and a device allowing the alignment of conveyed packaging boxes even at high transport speeds.

According to an aspect of the present disclosure, a method for aligning rectangular packaging boxes comprises the steps of:
  conveying packaging boxes along a transport path in a conveying direction by means of a conveying device, wherein the conveying device comprises a first conveying unit and a second conveying unit opposite the first conveying unit, wherein the first conveying unit and the second conveying unit define the transport path, wherein the first conveying unit and the second conveying unit each comprise at least one belt, and wherein the first and second conveying units receive and jointly convey the packaging boxes between them;
  and aligning each packaging box of the conveyed packaging boxes by means of at least one stop element, which is arranged in an area of the conveying device, wherein the step of aligning each packaging box comprises the steps of:
  arranging the at least one stop element in a first position, in which the at least one stop element is arranged stationary and projects into the transport path;
  conveying the packaging box against the at least one stop element, wherein the conveying device continues to move in the conveying direction relative to the at least one stop element and thus forces the packaging box against the at least one stop element, until each section of the packaging box facing the at least one stop element rests against the at least one stop element; and
  moving the at least one stop element out of the first position and into a second position after each section of the packaging box facing the at least one stop element is resting against the at least one stop element, wherein the at least one stop element, when in the second position, does not project into the transport path, and thus releases the aligned packaging box for further transport in the conveying direction.

The step of aligning an individual packaging box of the conveyed packaging boxes is preferably conducted for each of the conveyed packaging boxes and thus repeated accordingly for each box.

In this way, a method is provided by which the packaging boxes can be aligned particularly quickly, precisely, and reliably during their transport. The at least one stop element is arranged in the first position while a packaging box to be aligned is still approaching. As soon as a leading section of the packaging box contacts the at least one stop element, the at least one stop element blocks the packaging box in at least this section. For this purpose, the at least one stop element is held stationary in the first position. The conveying device continues to move in the conveying direction. Because of the frictional contact between the conveying device and the packaging box in question, the conveying device thereby forces the packaging box more and more against the at least one stop element. The at least one stop element is configured in such a way that the packaging box to be aligned is precisely aligned as soon as each section of the packaging box facing the at least one stop element rests against the at least one stop element. Because the deformation of a packaging box is usually small and the speed at which the conveying device conveys the packaging boxes is relatively high, the packaging boxes can be aligned in fractions of a second. As soon as the packaging box is correctly aligned, the at least one stop element moves out of the first position and into a second position, in which the at least one stop element does not project into the transport path. As a result, the aligned packaging box is released and conveyed further in the conveying direction by the conveying device.

The packaging boxes are preferably configured as folding boxes. The first and second conveying units are preferably configured as first and second belt conveyors, particularly preferably as an upper and a lower conveyor. In all cases, the first and second conveying units comprise a section in which the belts of the first and second conveying units face each other in a direction transverse to the conveying direction, are parallel to each other, and define the transport path. For this purpose, the first and second conveying units can be arranged horizontally next to each other, wherein they act on the sides of the packaging boxes. The first and second conveying units, however, can also be arranged vertically, one above the other, as is the case with an upper and a lower conveyor. In this case, the first and second conveying units act on the top and bottom sides of the packaging boxes.

Conveying units which are arranged opposite each other are particularly well adapted for conveying packaging boxes at high speeds, because they hold the packaging boxes reliably between parallel belt sections and prevent the boxes from shifting relative to the respective conveying unit. In addition, they apply a force to both sides of the boxes, as a result of which the boxes are conveyed uniformly and aligned properly when they contact the at least one stop element.

It is particularly preferred that the at least one stop element comprises a plurality of stop elements. The step of aligning each packaging box then comprises aligning each packaging box of the conveyed packaging boxes by means of the plurality of stop elements. The step of moving the at least one stop element further accordingly comprises moving the plurality of stop elements simultaneously from the first position to the second position. When a packaging box approaches, individual sides of which are at a slant to each other, the maximum deformation of the box is present in edge sections of the leading surface of the box. The box as a whole can be aligned reliably and precisely by aligning it at defined stop sites distributed over its leading surface.

This can be achieved by providing a plurality stop elements, wherein each of which defines a stop site for the packaging box to be aligned. Preferably, the plurality of stop elements can be made small in size and thus be light in weight. The plurality of stop elements are preferably arranged in such a way that, when in the first position, the stop elements are adjacent to and distributed along edge sections of the leading surface of the packaging box to be aligned.

It is also particularly preferred that the stop sites of the plurality of stop elements, against which each packaging box comes to rest, define a plane perpendicular to the conveying direction. The number of stop elements being necessary to define said plane depends on the shape of the at least one stop site. If the at least one stop element is configured in such a way that the packaging box rests flat against the stop element, which means that the stop site is therefore a contact surface, this contact surface defines said plane, and a single stop element is sufficient. If the stop sites, however, are small, e.g., in the form of stop points or stop lines, preferably three stop elements are provided. These three stop elements, at least two of them being arranged on opposite sides of the transport path in a direction transverse to the conveying direction, then define said plane. Preferably, two stop elements are arranged in the area of one edge section of the leading surface of the packaging box to be aligned, and at least one stop element is arranged in the area of an opposite edge section of the leading surface of the packaging box.

Once each section of the packaging box facing the stop element is resting against the respective stop element, the leading surface of the packaging box lies in the plane defined by the at least one stop site. The sides of the packaging box are then perpendicular to each other and the packaging box is aligned as desired.

According to a preferred embodiment, at least a first stop element and a second stop element of the plurality of stop elements are arranged on one side of the transport path, and at least a third stop element and a fourth stop element of the plurality of stop elements are arranged on a side of the transport path opposite the first and second stop elements in a direction transverse to the conveying direction. As a result, the leading surface and thus the entire packaging box are aligned both, in a first transverse direction perpendicular to the conveying direction and also in a second transverse direction, the second transverse direction being perpendicular to the conveying direction and the first transverse direction. The first and second stop elements are preferably arranged above the transport path, and the third and fourth stop elements are preferably arranged below the transport path. The first and second stop elements, however, could also be arranged to the right of the transport path, and the third and fourth stop elements to the left of the transport path.

The stop sites of the four stop elements, at which the packaging box comes to rest, define the plane for aligning the packaging box. At the same time, the first and second stop elements and/or the third and fourth stop elements can be distributed transversely to the conveying direction, so that even boxes having lesser degrees of shape stability can be aligned precisely without becoming deformed, e.g., by being bent over a respective stop site.

The movement of the at least one stop element between the first and second positions preferably comprises pivoting the at least one stop element between the first and second positions around a pivot axis. As a result of this pivoting motion, the at least one stop element can move extremely quickly between the first and second positions. In addition, the pivoting motion offers the advantage of the at least one stop element being pivoted from the first to the second position in a direction parallel to the conveying direction of the packaging boxes. This guarantees that the packaging box will not collide with the at least one stop element while same is moving out of the first and into the second position and thereby continuously releasing the packaging box for further transport. The aligned packaging box thus retains its shape while and after being released and is then conveyed further in the conveying direction.

The at least one stop element, however, can also be shifted linearly between the first and the second position. In this case, the at least one stop element could be configured as a pin, for example, which is pushed into the transport path in a direction parallel to the first or second transverse direction.

If the at least one stop element is to be pivoted between the first and second positions, a shaft which extends in a direction transverse to the conveying direction is preferably provided. This shaft then defines the pivot axis, wherein the at least one stop element is mounted on the shaft. If a plurality of stop elements are provided, preferably a first and a second shaft are provided, wherein the first shaft extends transversely to the conveying direction on one side of the transport path, and the second shaft extends transversely to the conveying direction on the opposite side of the transport path. At least one stop element is then mounted on the first shaft, and at least one stop element is mounted on the second shaft.

The shafts can be configured as cylindrical shafts, or they can comprise a cross section facilitating a positive connection between the shaft and the associated stop element. In general, any shaft-hub type of connection between a shaft and an associated stop element being suitable to transfer torque can be provided.

Providing at least one shaft for pivoting the at least one stop element offers the advantages that a shaft can be integrated into a device for aligning packaging boxes in an particularly space-saving and easy manner. Also, the pivoting movement of the at least one stop element supported by the shaft can be controlled with precision and various drives are available for moving the at least one shaft back and forth at the necessary speed. In addition, it is thus also easily possible to pivot several stop elements arranged on one shaft simultaneously.

If multiple shafts are provided, such as for example the first and the second shafts, on each of which at least one stop element is arranged, the shafts can also be coupled by a gear unit to ensure simultaneous movement of the plurality of stop elements between the first and second positions.

The at least one shaft is preferably driven by a drive. In a preferred embodiment, the drive is configured as a servo-motor, a rotary magnet, or as a pneumatic or mechanical drive. If the at least one stop element is moved in linear fashion, a standard linear drive may be used, such as a pneumatic, hydraulic, electric, or magnetic drive.

If a first and a second shaft are provided, each shaft can be provided with its own drive, wherein the drives are then to be synchronized. A gear unit between the first and second shaft can then be omitted. If the gear unit is provided, however, a single drive is sufficient to drive the first and second shafts.

It is particularly preferred that the first and second conveying units be driven synchronously and continuously. The conveying units are preferably driven at a constant speed. Because they are driven synchronously, the first and second conveying units do not move at a relative speed with respect to each other. Since the first and second conveying units are arranged on opposite sides of the conveyed packaging boxes, relative movement between the first and second conveying units would lead to a displacement of the sides of the packaging boxes with respect to each other and thus to a deformation of the packaging boxes.

In a preferred embodiment, the first conveying unit and the second conveying unit hold the packaging boxes between them by frictional connection. Packaging boxes in any position or with any orientation can thus be taken over as quickly as possible by the conveying device and then conveyed in the conveying direction. Another positive result is that, as soon as the packaging box rests at least partially against the at least one stop element, relative movement is possible between the first conveying unit and/or the second conveying unit and the packaging box to aligned. This is necessary particularly when only a part of the packaging box is resting against the at least one stop element, while another part of the packaging box is not resting against a respective stop element due the box's deformation and must still be conveyed to the stop element.

If a positive connection were to be provided between the first or second conveying unit and the packaging box, the elements creating such positive connection would deform the packaging box as soon as the box rests against the at least one stop element and the conveying device continues to move in the conveying direction.

The conveying device preferably conveys the packaging boxes at a speed of at least 6 m/min, more preferably of at least 30 m/min, and even more preferably of at least 60 m/min. It is particularly preferred that the conveying device conveys at least 10 packaging boxes per minute, more preferably at least 200 packaging boxes per minute, and even more preferably at least 300 packaging boxes per minute. Depending on the size of the packaging boxes, a conveying speed in the range of between 6 m/min and 60 m/min is necessary to reach the target value of 300 packaging boxes per minute. It is therefore preferred that the conveying speed be continuously variable in order to be adaptable to packages of different dimensions.

In a preferred embodiment, a label is applied to the packaging box after it has been aligned. The label can contain information on, for example, the type, quantity, effect, and use of the package content. In addition or alternatively, the label can identify the packaging boxes individually (by means of barcodes or QR codes, for example) and/or it can form a tamper-evident feature, which prevents or makes obvious any tampering with the package content. Various types of any such labels can be used at this point.

In one embodiment, an adhesive label forms an identifier, which is applied to the packaging box in such a way that it extends from a first side of the box over and around an edge of the box onto a second side of the box. The box is preferably configured as a folding box, and the first or second side of the box is formed by a top or bottom flap to be opened to access the package content. When the box is opened by pulling out the top or bottom flap, the adhesive label is therefore damaged and makes it obviously visible that the box has already been opened for the first time. If the adhesive label extends around an edge of the box, it is particularly important that the box be correctly aligned beforehand, i.e., that the side surfaces of the box be perpendicular to each other. Only then is it possible for the adhesive label to be applied to the box around one of its edges without the formation of folds.

According to a preferred embodiment, the step of arranging the at least one stop element in the first position comprises the following steps:
  detecting a packaging box approaching the at least one stop element by means of a sensor;
  transmitting a signal to a control unit when the sensor detects an approaching packaging box; and initiating the movement of the at least one stop element into the first position by means of the control unit when the control unit has received the signal.

Arranging the at least one stop element in the first position can also be done automatically at a certain predetermined time after the at least one stop element has moved into the second position. The first predetermined time is sufficient to allow the aligned packaging box to move completely past the at least one stop element, which is then ready for alignment of a subsequent packaging box.

Moving the at least one stop element out of the first position and into the second position is preferably initiated by the control unit as soon as a predetermined threshold is reached.

The predetermined threshold is preferably a predetermined time. In a preferred embodiment, arranging the at least one stop element in the second position then comprises detecting a packaging box approaching the at least one stop element by means of a sensor, transmitting a signal to a control unit, when the sensor detects an approaching packaging box, and initiating movement of the at least one stop element into the second position by means of the control unit at a second predetermined time after the control unit has received the signal. The second predetermined time is sufficient for the packaging box to be conveyed from the sensor to the at least one stop element and to be aligned there. The second predetermined time can be calculated from the distance between the sensor and the at least one stop element, a maximum possible deformation of the conveyed packaging boxes, and the conveying speed. The second predetermined time can further be increased under certain conditions by a buffering time.

The sensor is formed by, for example, a light barrier, which extends across the transport path transversely to the conveying direction.

The predetermined threshold, however, can also be a force, which the packaging box exerts on the at least one stop element as soon as it is resting correctly, in its aligned state, against the at least one stop element. Appropriate sensors for detecting forces can be provided on the at least one stop element or on its support, e.g., on the at least one shaft.

According to another aspect of the present disclosure, a device for aligning rectangular packaging boxes comprises a conveying device, which comprises a first conveying unit and a second conveying unit opposite the first unit, wherein the first and second conveying units define a transport path of the packaging units and are configured to convey the packaging boxes along the transport path in a conveying direction, wherein the first conveying unit and the second conveying unit each comprise at least one belt and receive the packaging boxes between them. The device also comprises a plurality of stop elements, which are arranged in an area of the conveying device and which are movable between a first position and a second position, wherein the plurality of stop elements, when in the first position, project into the transport path and, when in the second position, do not project into the transport path. The device further comprises a first and a second shaft each defining a pivot axis, wherein the first shaft extends transversally to the conveying direction on one side of the transport path, and the second shaft extends transversally to the conveying direction on a side of the transport path opposite the first shaft. At least one stop element of the plurality of stop elements is arranged on the first shaft, and at least another stop element of the plurality of stop elements is arranged on the second shaft. The plurality of stop elements are pivotable between the first and second positions.

In this way, a device is provided by means of which packaging boxes can be aligned quickly and precisely against at least one stop element as they are being transported by the conveying device. In particular, the device is suitable to of execute the previously described method for aligning rectangular packaging boxes in an advantageous manner. This is achieved in particular by the at least one stop element, when in its first position, projecting into the transport path, while the conveying device continues to move in the conveying direction. Packaging boxes conveyed by the conveying device are thus forced against the at least one stationary stop element until each section of the packaging box facing the at least one stop element is resting against the at least one stop element, whereupon this element then releases the packaging boxes for further transport in the conveying direction.

Preferably, the plurality of stop elements are coupled in such a way that the stop elements can be moved simultaneously out of their first position and into their associated second position. For this purpose, several drives may be be provided for driving the plurality of stop elements, wherein the drives are actuated synchronously, thus resulting in the coupling of the stop elements. The stop elements, however, can also be coupled together mechanically. For example, the stop elements can be arranged on a common carrier or a common shaft or several shafts can be connected to each other by means of a gear unit. As a result of the simultaneous movement, the aligned packaging boxes will not collide with any of the plurality of stop elements, what could occur if some of the stop elements have already released the packaging boxes while other stop elements are still in their first position. Any further deformation of the previously aligned packaging boxes is thus avoided.

It is particularly preferable for stop sites of the plurality of stop elements, against which the packaging boxes come to rest, to define a plane which is perpendicular to the conveying direction. Concerning the configuration of the plane, reference can be made to the explanations given above. Once each section of the packaging box facing the stop element is resting against the stop element in question, the leading surface of the box extends within said plane defined by the at least one stop site. The sides of the packaging box are now in a state in which they are oriented perpendicularly to each other, i.e. aligned as desired.

DETAILED DESCRIPTION

Figure 1:
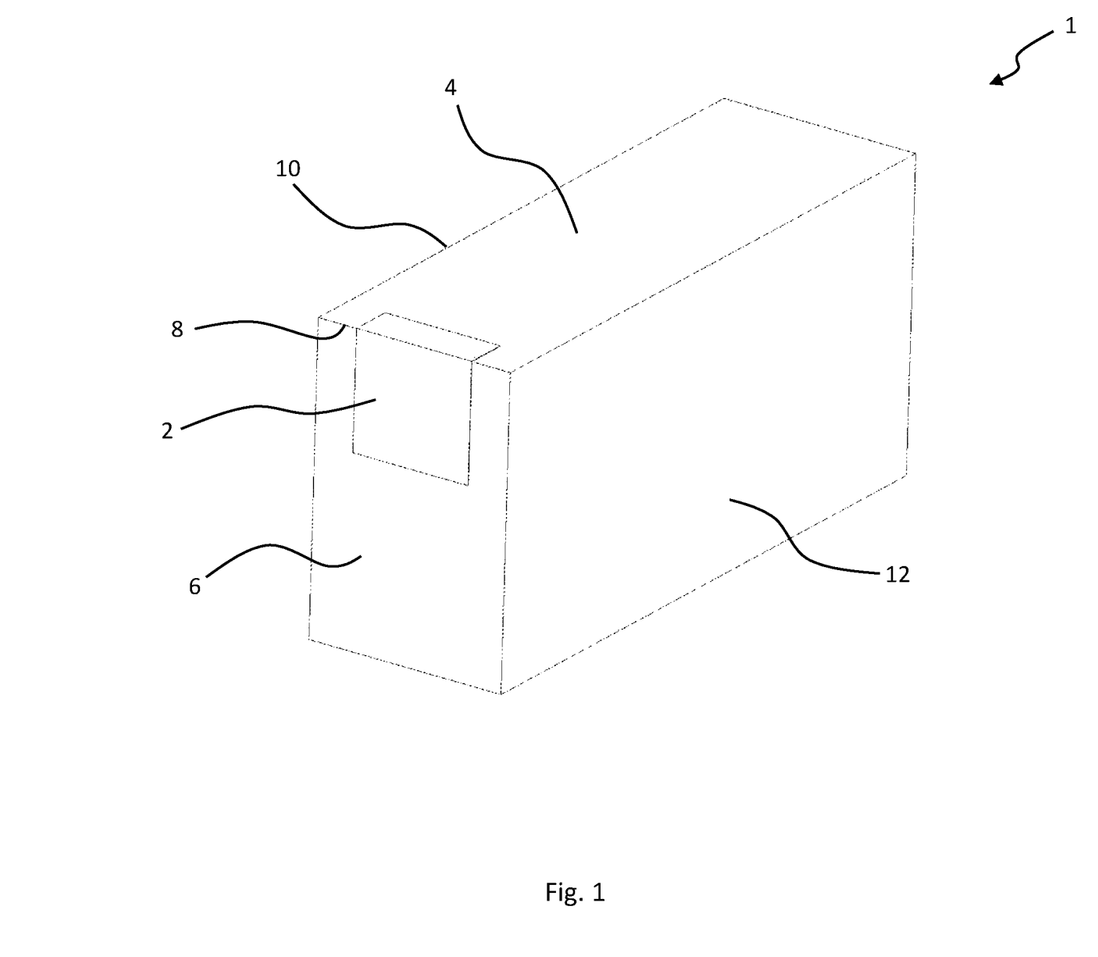
FIG. 1 is an isometric view of an exemplary embodiment of a packaging box to be squared up.

FIG. 1 shows a packaging box 1 of the type used, for example, to package pharmaceutical products. The packaging box 1 has a cuboid-shaped or rectangular configuration. The packaging box 1 therefore has side surfaces which are substantially perpendicular to each other. The packaging box 1 is preferably configured as a folding box. A folding box is usually closed by means of a bottom flap and a top flap after inserting an associated tuck-in flap. The packaging box 1 is erected in a cartoning machine, filled with a product (e.g., blister packs) and a package insert, and then closed. In the cartoning machine, the packaging box 1 is transported in a dimensionally stable manner to guarantee the reliable introduction of the product into the box 1. At an outlet of the cartoning machine, the packaging box 1 is transferred to a downline machine, such as a labeling machine and/or a serializing machine.

Between the cartoning machine and the subsequent machine there is an interface in the form of, for example, a discharge belt. As regards the conveyance of the packaging boxes 1, the requirements of the downline machine are usually significantly different from that of the cartoning machine. Often, the packaging boxes 1 can thus, at the interface, no longer be transported with shape stability. It can therefore happen that the packaging boxes 1 become deformed, particularly at the transfer point between the cartoning machine and the downline machine, so that at least some of the side surfaces of the packaging boxes 1 are no longer perpendicular to each other.

This can have a disadvantageous effect on the subsequent process of handling the packaging boxes 1. If, for example, the deformation results in that the edges of the packaging box 1 are displaced relative to the nominal position of a correctly aligned packaging box 1, an identifier can no longer be applied properly to the packaging box 1 in the downline machine. When, for example, an identifier is applied in the downline machine to an area of the packaging box 1, e.g., by printing, adhering, or lasering, a deformation of the box 1 has the effect that the area intended to receive the identifier no longer coincides with the area to which the identifier is in fact applied.

In the exemplary embodiment according to FIG. 1, the identifier 2 is formed by an adhesive label. The adhesive label extends from a first side 4 of the packaging box 1, around an edge 8 of the box 1, and onto a second side 6 of the box 1. In an aligned state of the packaging box 1, the first side 4 and the second side 6 are perpendicular to each other. The second side 6 preferably corresponds to a top or bottom flap of the packaging box 1. The adhesive label 2 is applied to the packaging box 1 in a labeling machine. For this purpose, a section of the adhesive label 2 is first adhered to the first side 4 or to the second side 6, and is then laid around the edge 8 by means of appropriate guide means and adhered to the corresponding other side, i.e., to the first side 4 or second side 6.

If the packaging box 1 has not been aligned correctly—that is, for example, a third side 10 and a fourth side 12 are not perpendicular to the first side 4 and/or if the second side 6 is not perpendicular to the first side 4—the adhesive label 2 will form a fold in an area of the edge 8 of the packaging box 1 upon application of the adhesive label 2 or after the packaging box 1 has been restored to the aligned state. To ensure the quality of the packaging and of a security feature, such as the identifier 2, it is necessary to avoid the formation of such folds.

But even in cases where the packaging box 1 is identified in other ways, it is advantageous for the area intended to receive the identifier to coincide with the area in which the identifier is in fact applied to the packaging box 1 in order to allow proper application of the identifier as well as reliable detection of the identifier.

This can be achieved by aligning the each individual packaging box 1 by means of the method and the device described herein.

Figure 2:
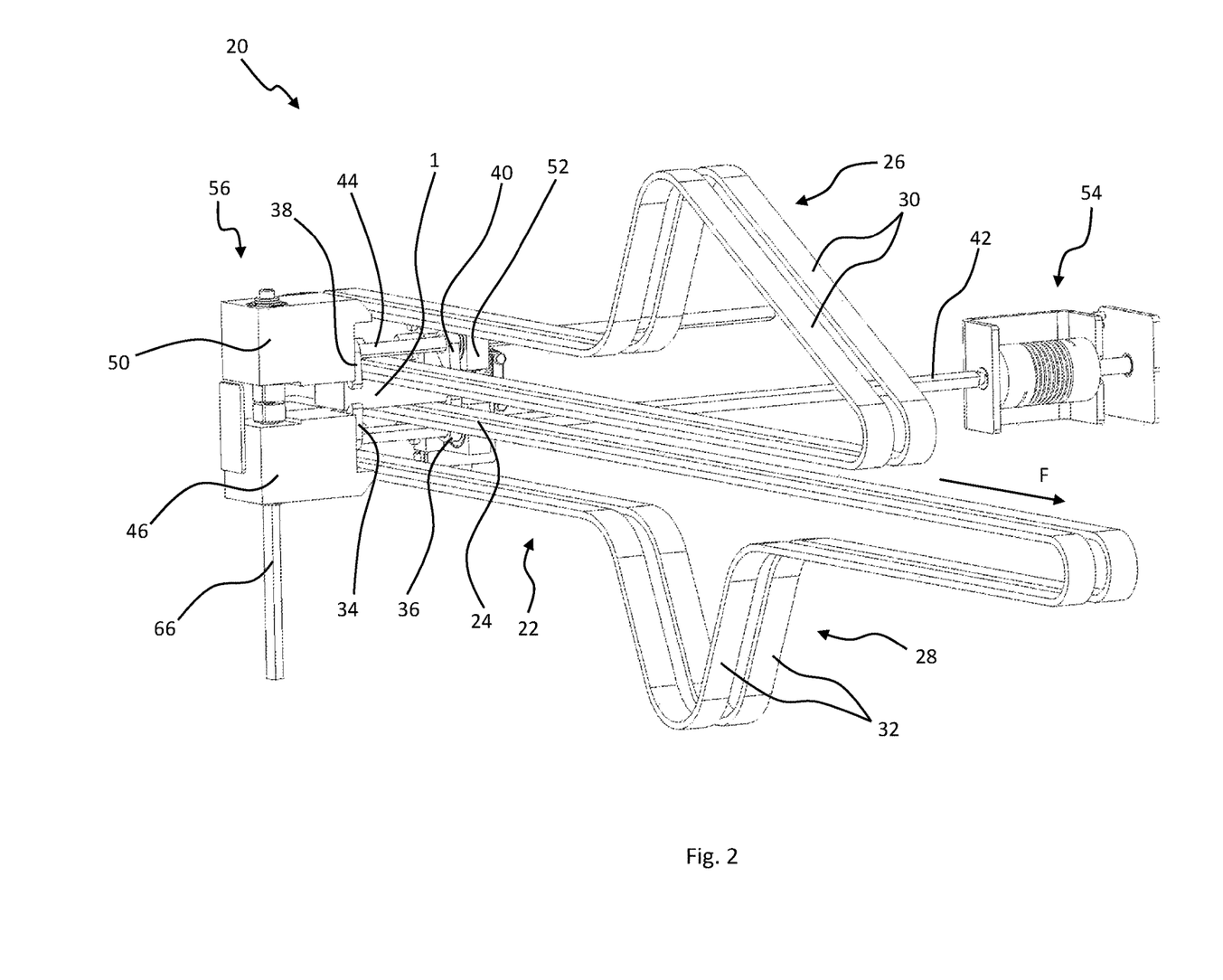
FIG. 2 is an isometric view of an embodiment of a device according to the disclosure.
Figure 3:
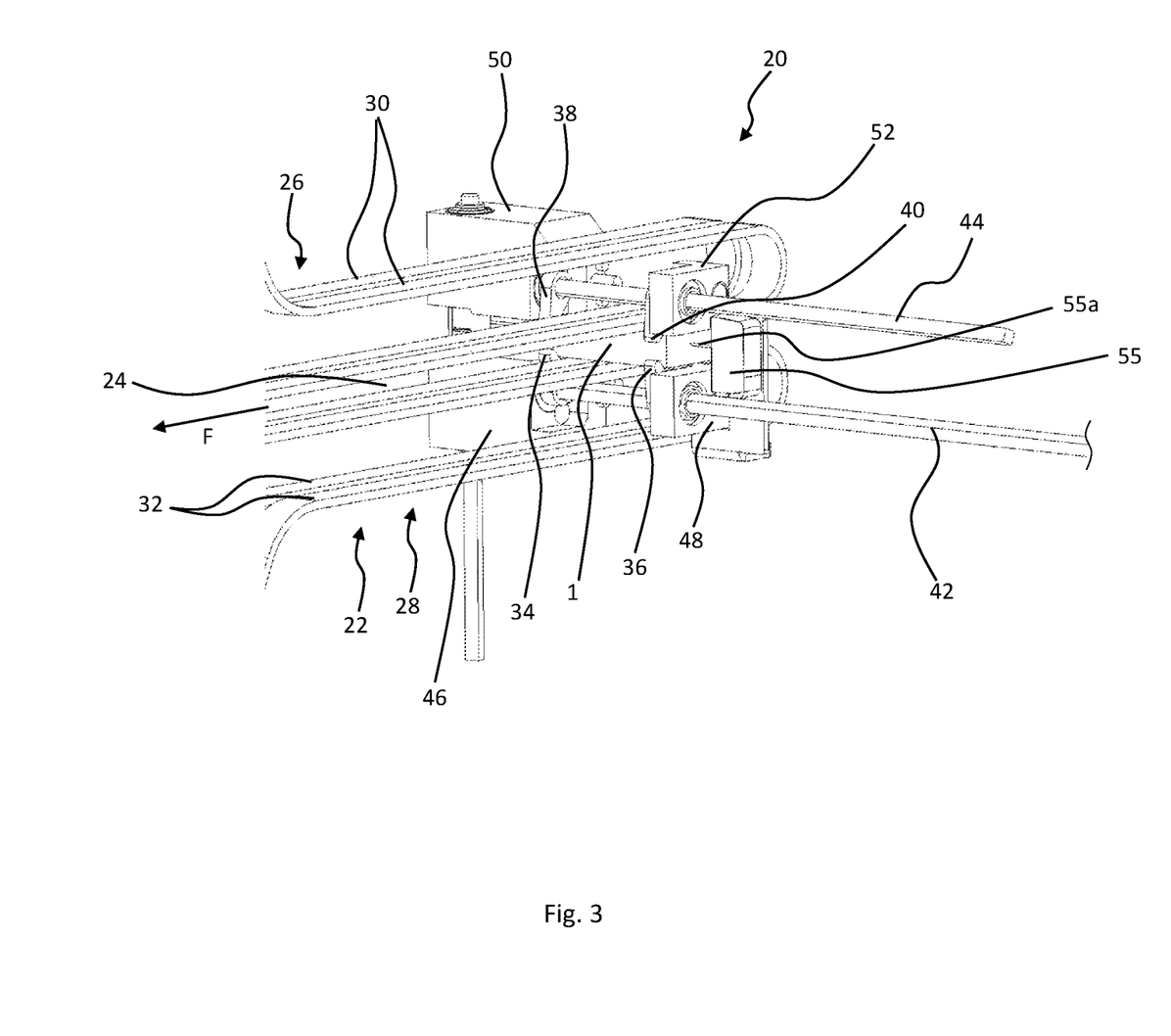
FIG. 3 is another isometric view of part of the device shown in FIG. 2.

FIGS. 2 and 3 show an embodiment of a device 20 in an isometric view. For the sake of clarity and simplicity, a machine frame and support components of the device 20 within the machine frame are not shown.

The device 20 comprises a conveying device 22 for conveying a packaging box 1 along a transport path 24 in a conveying direction F. The conveying device 22 comprises a first conveying unit 26 and a second conveying unit 28 opposite the first conveying unit 26. The first conveying unit 26 and the second conveying unit 28 define the transport path 24, receive the packaging boxes 1 between them, and convey them jointly in the conveying direction F. In particular, the first conveying unit 26 and the second conveying unit 28 each comprise at least one belt 30, 32. Certain sections of the belts 30, 32 of the first conveying unit 26 and of the second conveying unit 28 run parallel to each other and parallel to the conveying direction F. These sections of the belts 30, 32 are arranged a certain distance apart transversely to the conveying direction F in such a way that they can receive and hold the packaging boxes 1 between them. The first conveying unit 26 and the second conveying unit 28 are in frictional connection with the packaging boxes 1, i.e., with side surfaces of the packaging boxes 1 facing the associated conveying unit 26, 28. The parallel sections of the first and second conveying units 26, 28, in which the packaging boxes 1 are received between the first conveying unit 26 and the second conveying unit 28, define the transport path 24.

In the embodiment shown, the first conveying unit 26 is formed by an upper conveyor, and the second conveying unit 28 is formed by a lower conveyor, wherein each of the upper conveyor and the lower conveyor comprises two belts 30, 32. The first and second conveying units 26, 28, however, do not necessarily have to be formed by an upper and a lower conveyor. It is also possible that the first and second conveying units 26, 28 could instead be arranged along the sides of the packaging boxes 1 to be conveyed and face each other in a horizontal plane transverse to the conveying direction F. The skilled person is familiar with various embodiments of suitable conveying devices 22 by means of which packaging boxes 1 can be transported reliably at a required speed.

The device 20 can also comprise a first and a second lateral guide (not shown), which are opposite each other transversely to the conveying direction F and extend along the transport path 24 parallel to the conveying direction F. The lateral guides can form guide surfaces, which rest against the side surfaces of the packaging boxes 1, which do not engage with the conveying device 22. If the conveying device 22 comprises, for example, an upper and a lower conveyor, the first and second lateral guides would be arranged along the transport path 24 on horizontally opposite sides of the packaging boxes 1. Generally speaking, however, lateral guides are not absolutely necessary.

The belts 30, 32 of the first and second conveying units 26, 28 are preferably configured as endless belts, which are guided around appropriate deflecting rollers, which also serve to tension the belts 30, 32. The deflecting rollers of the belts 30, 32 are supported in the machine frame, but they are not shown in the figures for the sake of simplicity. The first and second conveying units 26, 28 also comprise a drive, formed, for example, by a driven roller. The first and second conveying units 26, 28 can comprise a common drive, or each conveying unit 26, 28 can have its own independent drive. The first and second conveying units 26, 28 are preferably driven synchronously to avoid relative motion between the first conveying unit 26 and the second conveying unit 28, because such relative motion could deform the packaging boxes 1. The first and second conveying units 26, 28 are also preferably driven at a constant speed. Particularly during the time that the packaging boxes 1 are being aligned, as will be described further below, the first and second conveying units 26, 28 are driven continuously, preferably at constant speed, in the conveying direction F. It is also conceivable that the first and second conveying units 26, 28 could be operated at a faster and then at a slower speed in an alternating manner, i.e., they could have a speed profile, although this would increase the amount of control effort required.

The device 20 further comprises at least one stop element 34 for aligning the packaging boxes 1 conveyed by the conveying device 22. The at least one stop element 34 is movable between a first and a second position, wherein in its first position, the at least one stop element 34 projects into the transport path 24 of the packaging boxes 1, and in its second position, the at least one stop element 34 does not project into the transport path 24 of the packaging boxes 1. A box 1 conveyed by the conveying device 22 in the conveying direction F is therefore conveyed against the at least one stop element 34 being arranged in the first position.

The at least one stop element 34 is configured in such a way that a rectangular packaging box 1 is correctly aligned—that is, in a state in which its side surfaces are perpendicular to each other—when each section of the packaging box 1 facing a stop element 34 is resting against the at least one stop element 34. This can be achieved in that a stop site or several stop sites of the at least one stop element 34, against which the packaging box 1 comes to rest, define a plane which is perpendicular to the conveying direction F.

When in its first position, the at least one stop element 34 is arranged in the transport path 24 in such a way that a leading surface of the packaging box 1 or leading edge sections of the packaging box 1 are conveyed against the at least one stop element 34. Once each section of the packaging box 1 facing the at least one stop element 34 is resting against the at least one stop element 34 at the respective stop site, the leading surface of the packaging box 1 will therefore be lying in the plane defined by the stop site or sites.

Various embodiments are conceivable for this purpose. It is possible, for example, to provide only one stop element having a larger surface area. A stop element of this type can be configured, for example, as a bar, which comprises a stop surface as its stop site, this stop surface being perpendicular to the conveying direction F when the stop element is arranged in its first position. The stop surface is made large enough to ensure that the packaging box 1 is aligned against it when the conveying device 22 forces the packaging box 1 against said stop surface.

It is, however, preferred to provide a plurality of smaller stop elements, which define a corresponding plane for aligning the packaging boxes 1. Depending on the stiffness of the packaging boxes 1 used, the number of stop elements provided can be larger or smaller.

In the embodiment of the device 20 shown in FIGS. 2 and 3, the device 20 comprises four stop elements, namely, a first stop element 34, a second stop element 36, a third stop element 38, and a fourth stop element 40. It is obvious that the skilled person will be able to adapt the device 20 to any desired number of stop elements on the basis of the description of the present embodiment, which is offered by way of example and which is representative of any plurality of stop elements.

The stop elements 34, 36, 38, 40 are shown in their first position, in which each of them projects into the transport path 24 of the packaging boxes 1. The first and second stop elements 34, 36 extend from a bottom side of the transport path 24 into the transport path 24, and the third and fourth stop elements 38, 40 extend from a top side of the transport path 24 into the transport path 24. The first and second stop elements 34, 36 thus form stop sites for a lower edge section of the leading surface of the packaging box 1, and the third and fourth stop elements 38, 40 form stop sites for an upper edge section of the leading surface of the packaging box 1. This can be seen particularly clearly in FIGS. 6-8, which are described further below.

The stop elements 34, 36, 38, 40 are supported outside the transport path 24 in such a way that they can be moved out of the first position and into a second position, in which they do not project into the transport path 24. To facilitate a uniform alignment of each packaging box 1 over its width, the first and second stop elements 34, 36 are arranged as far away as possible from each other and the third and fourth stop elements 38, 40 are arranged as far away as possible from each other in a direction transverse to the conveying direction F respectively. The first and second stop elements 34, 36 preferably accommodate the at least one belt 32 of the second conveying unit 28 between them, and the third and fourth stop elements 38, 40 accommodate the at least one belt 30 of the first conveying unit 26 between them. When the stop elements 34, 36, 38, 40 are all arranged in their first position, as shown, they block the packaging box 1, so that this packaging box 1 cannot be moved any further in the conveying direction F by the conveying device 22.

In the particularly preferred embodiment shown in FIGS. 2-5, the stop elements 34, 36, 38, 40 are supported pivotably, so that they can be pivoted out of the first position and into the second position. This can preferably be achieved by arranging each stop element on a shaft, which extends transversely to the conveying direction F and defines a pivot axis of the stop element.

The device 20 therefore comprises at least one first shaft 42, on which the at least one stop element 34 is arranged. In the exemplary embodiment shown, the first and second stop elements 34, 36 are arranged on the first shaft 42, and a second shaft 44 is provided, on which the third and fourth stop elements 38, 40 are arranged on. The first and second shafts 42, 44 extend horizontally and transversely to the conveying direction F. In other embodiments, however, the first and second shafts 42, 44 can extend in any other direction transversely to the conveying direction F; in particular, they can also extend vertically. The stop elements 34, 36, 38, 40 can be configured as integral parts of the shaft, which can be in the form of a camshaft, for example, or they can be mounted as separate elements on the associated shaft 42, 44. The first, the second, the third, and the fourth stop element 34, 36, 38, 40 are configured here in the shape of cams and are supported positively on the associated shafts 42, 44. Alternatively, the stop elements can be connected to the associated shafts by a non-positive connection or by a permanent material bond. The skilled person can adapt the configuration and support of the stop elements to the existing requirements in any way desired.

Preferably, each shaft 42, 44 is supported in two bearing blocks. The first shaft 42 is rotatably supported in a first and a second bearing block 46, 48; and the second shaft 44 is rotatably supported in a third and a fourth bearing block 50, 52. The bearing blocks 46, 48, 50, 52 can be supported movably in the machine frame so that the device 20 can be adapted to different formats of the packaging boxes 1. As can be seen from FIGS. 2 and 4 in combination, the bearing blocks 46, 48, 50, 52 can be movable for the purpose of adjusting the distance between the first and second shafts 42, 44. In addition, so that the distance between the stop elements 34, 36, 38, 40 can be adjusted, at least one of the first bearing block 46 and the second bearing block 48 can be movable along the first shaft 42, and least one of the third bearing block 50 and the fourth bearing block 52 can be movable along the second shaft 44. Finally, the first and second conveying units 26, 28 can also be adaptable to suit the format of the packaging box 1. For this purpose, the distance between the first conveying unit 26 and the second conveying unit 28 can be adapted by shifting the positions of the parallel belt sections of the belts 30, 32, for example. If each conveying unit 26, 28 comprises more than one belt, the distance between the belts of a conveying unit can also be adapted if desired.

At least one of the first and second shafts 42, 44 is driven by a drive 54. Any drive capable of rotationally driving shafts known to the skilled person can be used for drive 54. The drive 54 is connected to a control unit (not shown), which actuates the drive 54 to move the stop elements at a correct time between the first position and the second position.

As can be seen in FIG. 3, the device 20 can also comprise a sensor 55. The sensor 55 is formed by, for example, a light barrier, the beam 55a of which is oriented transversely to the conveying direction F. The sensor 55 detects when a packaging box 1 is approaching a stop element 34. The sensor 55 transmits a signal to the control unit when it detects an approaching packaging box 1. The control unit is responsible for moving the at least one stop element 34 into the first position in time, so that the at least one stop element 34 arrives in the first position before the approaching packaging box 1 is located directly in front of the at least one stop element 34. For this reason, the control unit actuates the drive 54 accordingly. It is obvious that the sensor 55 can be arranged at any desired point in front of the at least one stop element 34, and that the time available for the at least one stop element 34 to reach the first position can be calculated from the conveying speed and the distance between the at least one stop element 34 and the sensor 55. The sensor 55 preferably also detects the packaging boxes 1 when they are resting against the at least one stop element 34.

So that a packaging box 1 which has been aligned by the stop elements 34, 36, 38, 40 can be conveyed further in the conveying direction F in a correctly aligned state, the stop elements 34, 36, 38, 40 must be moved simultaneously out of the first position and into the second position. There are various conceivable possibilities for doing so. First, the stop elements can be moved by several separate drives from the first position to the second position, wherein the drives are actuated in such a way that the stop elements move simultaneously out of the transport path 24. For example, the drive 54 drives the first shaft 42, and an additional drive is provided, which drives the second shaft 44. The two drives are then actuated in such a way that they turn the first and second shafts 42, 44 and thus the first and second stop elements 34, 36 and the third and fourth stop elements 38, 40 around the pivot axis defined by associated shaft 40, 42. As a result, the stop elements 34, 36, 38, 40 are pivoted between the first position and the second position simultaneously.

In the embodiment shown here, the device 20 comprises a gear unit 56 for transferring a rotational movement from either the first or the second shaft 42, 44 to the corresponding other shaft 42, 44. Any gear unit known to the skilled person for transferring a rotational movement or torque from one shaft to another shaft can be used for the gear unit 56. The gear unit 56 can be formed by spur gears, for example, wherein at least one spur gear is mounted on each shaft, or by a belt, such as a toothed belt, and it can comprise a fixed transmission ratio, several transmission ratios or a continuously variable transmission ratio.

Figure 4:
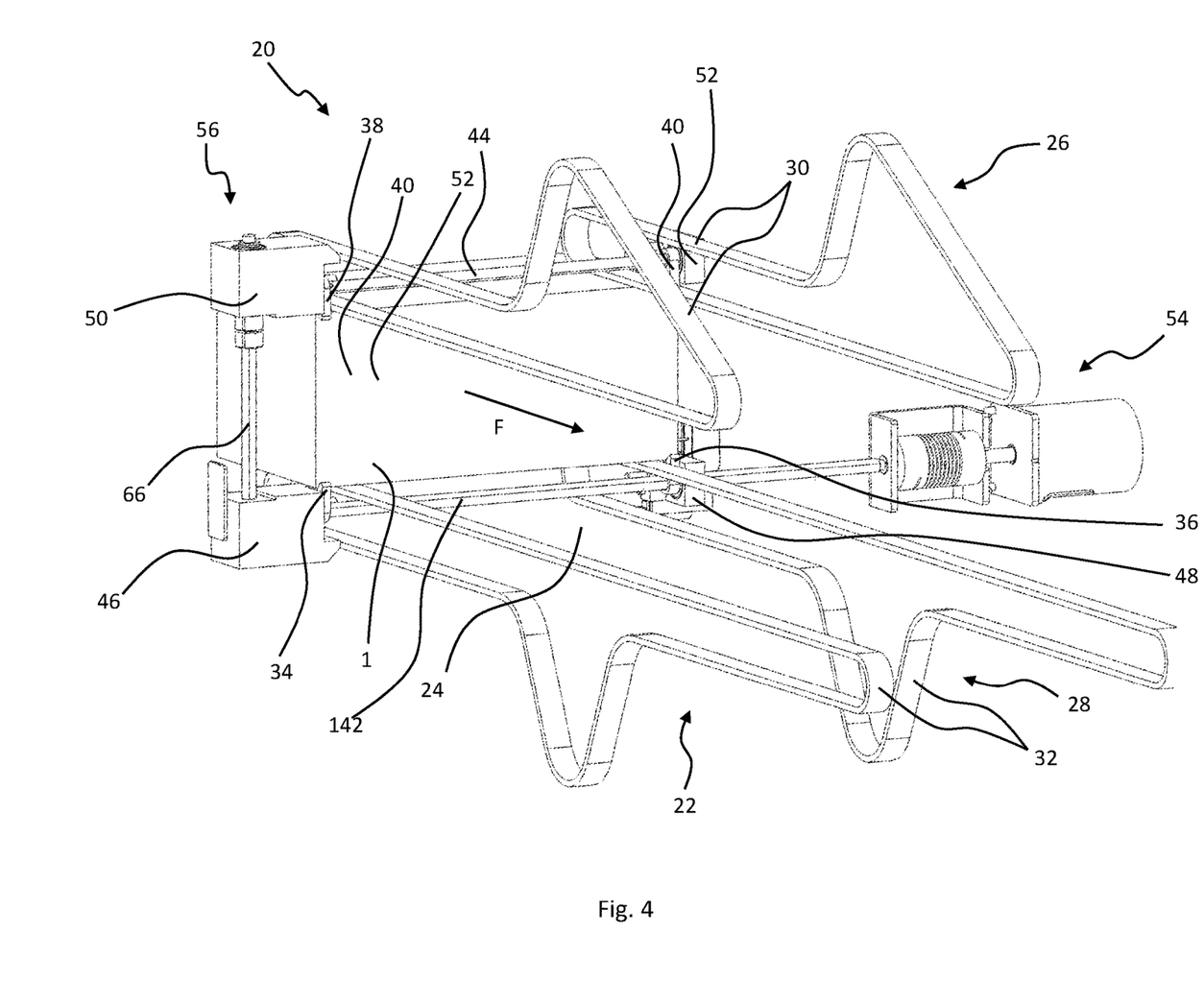
FIG. 4 is an isometric view of the device shown in FIG. 2 with a packaging box of larger format.
Figure 5A:
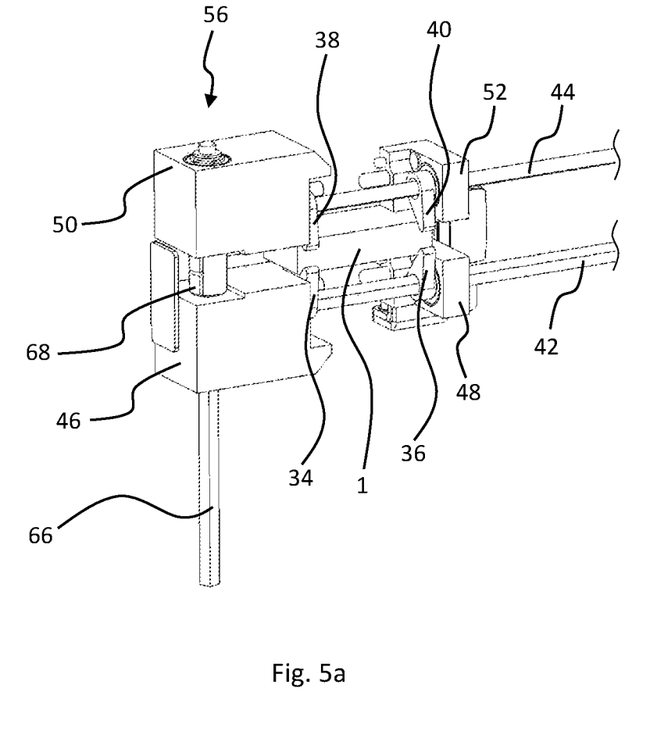
FIGS. 5a and 5b show an isometric view and a cross-sectional view of part of the device shown in FIG. 1.
Figure 5B:
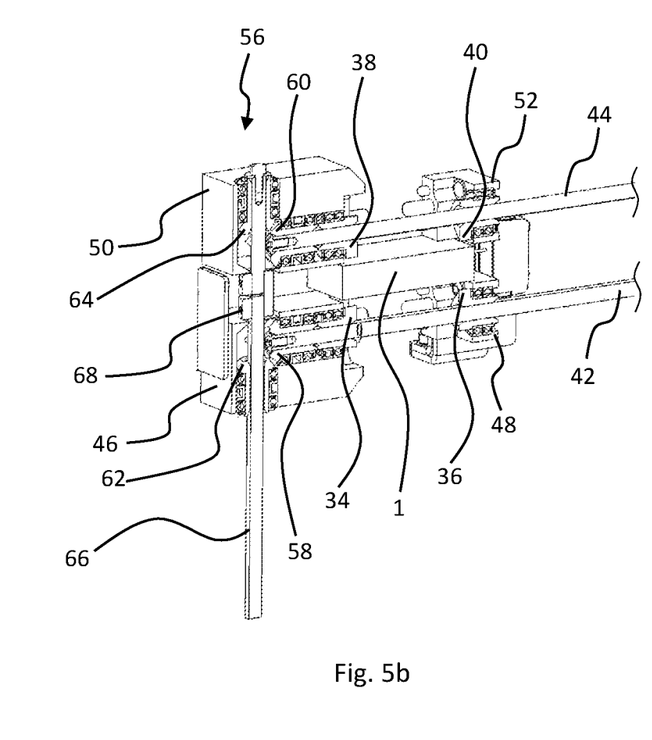

A preferred embodiment of the gear unit 56 is shown in FIGS. 5a and 5b. The gear unit 56 comprises a first bevel gear wheel 58, a second bevel gear wheel 60, a third bevel gear wheel 62, and a fourth bevel gear wheel 64. The first bevel gear wheel 58 is supported non-rotatably on the first shaft 42, for example, by means of a positive connection. The second bevel gear wheel 60 is supported non-rotatably on the second shaft 44 in a corresponding manner. The gear unit 56 comprises a third shaft 66, which is perpendicular to the first shaft 42 and to the second shaft 44. The rotational axis of the third shaft 66 intersects both, the rotational or pivoting axis of the first shaft 42 and the rotational or pivoting axis of the second shaft 44. The third and fourth bevel gear wheels 62, 64 are supported non-rotatably on the third shaft 66, for example, by means of a positive connection. The third bevel gear wheel 62 is mounted on the third shaft 66 in such a way that it meshes with the first bevel gear wheel 58 on the first shaft 42, and the fourth bevel gear wheel 64 is mounted on the third shaft 66 in such a way that it meshes with the second bevel gear wheel 60 on the second shaft 44. The first and third bevel gear wheels 58, 62 are supported rotatably in the first bearing block 46 by means of roller bearings, for example. The second and fourth bevel gear wheels 60, 64 are rotatably supported in the third bearing block 50 correspondingly. As a result, the third shaft 66 is also rotatably supported in the first bearing block 46 and the third bearing block 50. To accomplish an adaptation to different formats of the packaging boxes 1 as shown in FIG. 4, it is advantageous for at least one of the first and third bearing blocks 46, 50, to be movable along the third shaft 66.

A rotational movement or torque can be transferred from the first shaft 42 via the first and third bevel gear wheels 58, 62 to the third shaft 66, and from the third shaft 66 via the second and fourth bevel gear wheels 60, 64 to the second shaft 44. It is therefore sufficient to provide only one drive 54 to move all of the stop elements 34, 36, 38, 40. The drive 54 can be connected to any one of the first, second, or third shaft 42, 44, 66, wherein the rotational movement produced by the drive 54 is transmitted via the gear unit 56 to whichever of the other shafts 42, 44, and 66 are not themselves driven.

So that the position of the stop elements 34, 36 on one side of the transport path 24 can be set relative to the stop elements 38, 40 on the opposite side of the transport path 24, the gear unit 56 can also comprise a coupling 68. In the exemplary embodiment shown here, the third shaft 66 is configured as a two-part component, wherein the two parts of the third shaft 66 are connected by the coupling 68. By means of the coupling 68, the rotational movement of the first shaft 42 can be disengaged from the rotational movement of the second shaft 44. The position of the first and second stop elements 34, 36 on the first shaft 42 can thus be changed independently of the position of the third and fourth stop elements 38, 40 and vice versa.

Within the scope of the disclosure, the skilled person will be able to envision various modifications of the embodiments described herein in detail. If a packaging box 1 is relatively stiff, for example, because of its design, material or dimensions, or if it allows only a small degree of bending or displacement of the sides relative to each other, it can be sufficient to provide only one or two stop elements. For example, if the displacement occurs only between the upper edge and the lower edge of the leading surface of a packaging box 1, it can be sufficient to arrange only a single stop element in the area of the upper edge and only a single stop element in the area of the lower edge. If the packaging box is relatively stable dimensionally but is oriented at an angle to a horizontal transverse direction, two stop elements can again be sufficient, e.g., the first and second stop elements 34, 36, which are arranged in the left and a right edge areas. To define the plane in which the leading surface is aligned, it is preferable to provide at least three stop elements, two of which being arranged on one side of the transport path 24 and at least one of them being arranged on the opposite side of the transport path 24.

A method according to an aspect of the disclosure is described in greater detail below with reference to FIGS. 6-11 and on the basis of the device 20 according to FIGS. 2-5.

A packaging box 1 is transferred to the conveying device 22 at an entrance 70 to the device 20. The transfer usually proceeds from a cartoning machine by means of an interface such as a discharge belt. Because the packaging boxes 1 are usually not transported at the interface or during transfer to the conveying device 22 in manner which ensures their dimensional stability and alignment, it can happen that the originally rectangular packaging box 1 is deformed, so that its sides are no longer perpendicular to each other.

The conveying device 22 conveys the packaging box 1 along the transport path 24 in the conveying direction F. For this purpose, the conveying device 22 comprises the first conveying unit 26 and the second conveying unit 28. In the exemplary embodiment shown here, the belt 30 of the first conveying device 26 engages a first side 4 of the packaging box 1 forming a top 72, and the belt 32 of the second conveying device 28 engages a bottom 74 of the packaging box 1 opposite the top 72. The first and second conveying devices 26, 28, i.e., their belts 30, 32, frictionally engage the packaging box 1.

Figure 6:
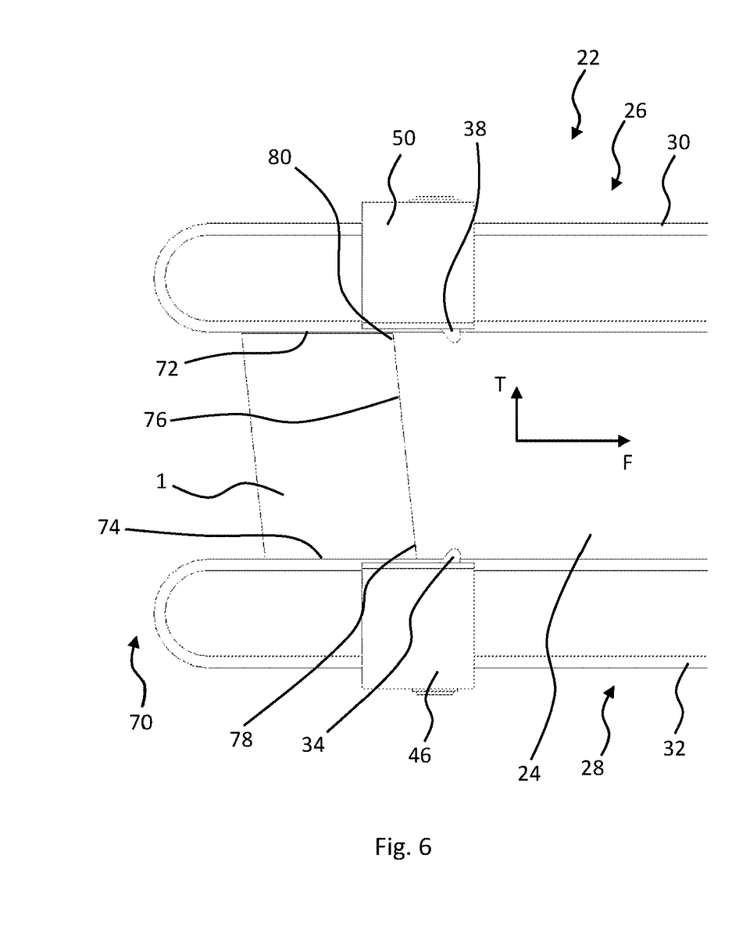
FIGS. 6-8 are side views of part of the device shown in FIG. 1 at different points in time during the method according to an aspect of the disclosure.

As can be seen in FIG. 6, the packaging box 1 is deformed at least with respect to the conveying direction F. More precisely, the packaging box 1 is tilted backwards relative to the conveying direction F, so that the fourth side 12 of the packaging box 1 forming a leading surface 76 is not perpendicular to the top 72 or the bottom 74. The leading surface 76 of the packaging box 1 is oriented at a slant to the first transverse direction T, which is perpendicular to the conveying direction F and which preferably extends vertically. This slanted position is what the method is intended to correct.

Figure 7:
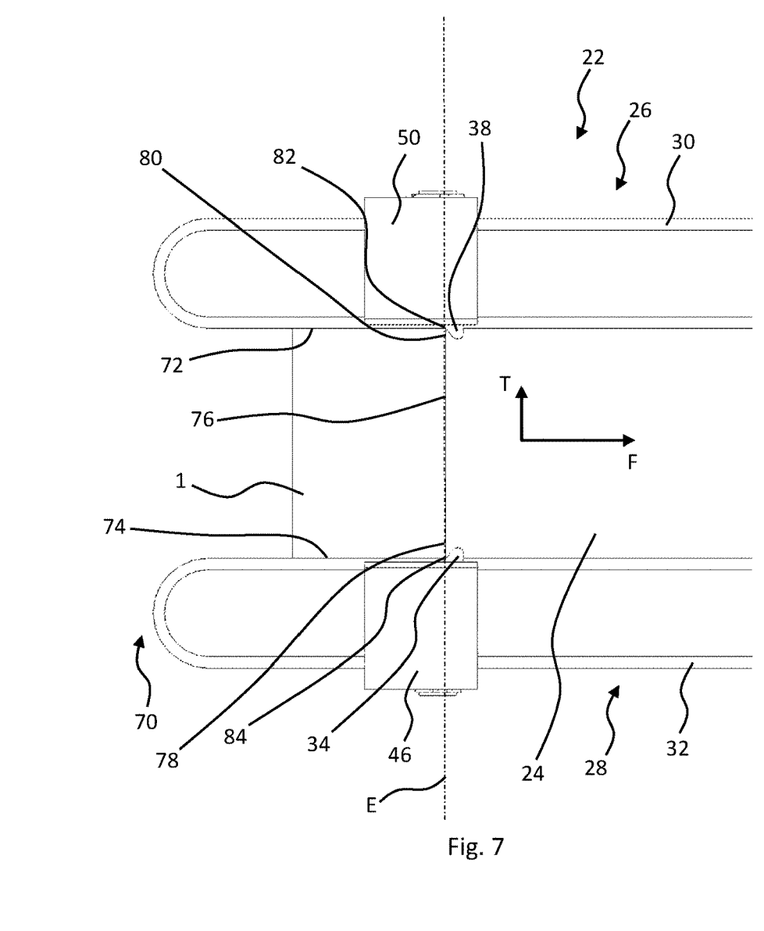

It can be seen in FIGS. 6 and 7 that the at least one stop element 34, here at least two stop elements, which can be formed by the first and third stop elements 34, 38 of the previously described device 20, are arranged in the first position. The packaging box 1 is conveyed up to the at least one stop element 34. The conveying device 22 continues to move relative to the at least one stop element 34 in the conveying direction F and thus forces the packaging box 1 against the at least one stop element 34 until each section of the packaging box 1 facing a stop element 34, 38 is adjacent to and resting against the associated stop element 34, 38.

In the embodiment shown here, a lower edge section 78 of the leading surface 76 of the packaging box 1 contacts the first stop element 34 and also contacts the second stop element 36, if present, which may be arranged next to the first stop element 34 transversely to the conveying direction F. At least the first stop element 34 then prevents the lower part of the packaging box 1 from moving further in the conveying direction F, even though the second conveying unit 28 is moving onward in the conveying direction F. As a result, the frictional connection between the belt 32 and the bottom 74 of the packaging box 1 is overcome, and thus there is slippage between the second conveying unit 28 and the packaging box 1. The upper part of the packaging box 1, however, continues to move in the conveying direction F until an upper edge section 80 of the leading surface 76 is resting against the third stop element 38. If a fourth stop element 40 is present, the upper edge section 80 then also rests against it, the fourth stop element being offset from the third stop element 38 transversely to the conveying direction F.

The packaging box 1 is in an aligned state once each section 78, 80 of the packaging box 1 facing the at least one stop element 34, 38 is resting against the associated stop element 34, 38. Stop sites 82, 84 of the stop elements 34, 38, against which the packaging box 1 comes to rest, define for this purpose a plane E, which is perpendicular to the conveying direction F. The plane E is also perpendicular to the sections of the belts 30, 32 of the first and second conveying units 26, 28 which define the transport path 24 and thus determine the orientation of the top 72 and the bottom 74 of the packaging box 1.

In the preferred embodiment shown here, in which the stop elements 34, 38 are configured in the shape of cams, the stop elements 34, 38 are arranged in the first position in such a way that a bottom edge of the leading surface 76 of the packaging box 1 contacts the first stop element 34, and an upper edge of the leading surface 76 contacts the third stop element 38. The contact sites 80, 82 in this case therefore have a linear configuration.

Figure 8:
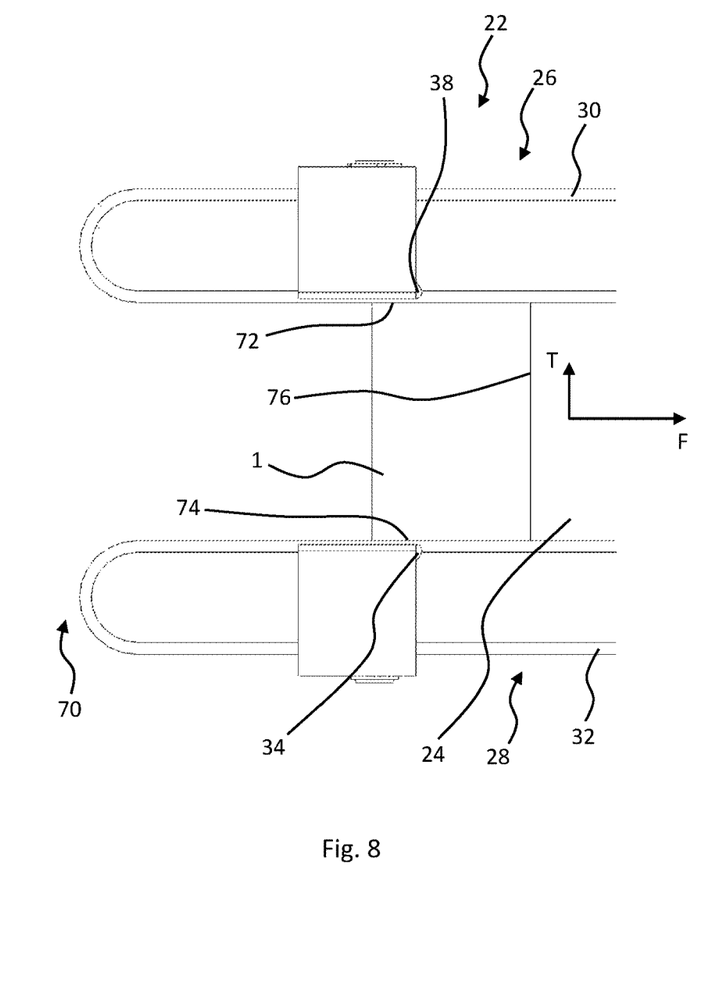

As can be seen from a combination of FIGS. 7 and 8, the aligned packaging box 1 is released and conveyed further in the conveying direction F by the conveying device 22. For this purpose, the at least one stop element 34, 38 is moved out of the first position shown in FIGS. 6 and 7 and into the second position shown in FIG. 8 after each section 78, 80 of the packaging box 1 facing the at least one stop element 34, 38 is resting against the at least one stop element 34, 38. In the second position, the stop elements 34, 38 no longer project into the transport path 24.

In particular, the first and second stop elements 34, 36, when in the second position, are located below a conveying plane defined by the belt 32, and the third and fourth stop elements 38, 40 are located above a conveying plane defined by the belt 30. So that certain stop elements do not hold back a section of the packaging box 1 after certain other stop elements have already released the packaging box 1, all of the stop elements 38, 40 are to be moved simultaneously out of the first position and into the second position. This is preferably done by rotation of the first and second shafts 42, 44 and thus by pivoting the stop elements 34, 36, 38, 40 from the first position into the second position, as previously described.

It can also be seen from FIGS. 7 and 8 that the first stop element 34 and possibly the second stop element 36 are pivoted in a clockwise direction from the first position to the second position. The third and possibly the fourth stop elements 38, 40, however, are pivoted in a counterclockwise direction from the first position to the second position. It is therefore necessary for the gear unit 56 to be configured such that the first shaft 42 rotates in a direction opposite to direction of rotation of the second shaft 44. Alternatively, the first and second shafts 42, 44 could each be rotated by its own separate drive, wherein the appropriate rotational direction is taken into account.

Figure 9:
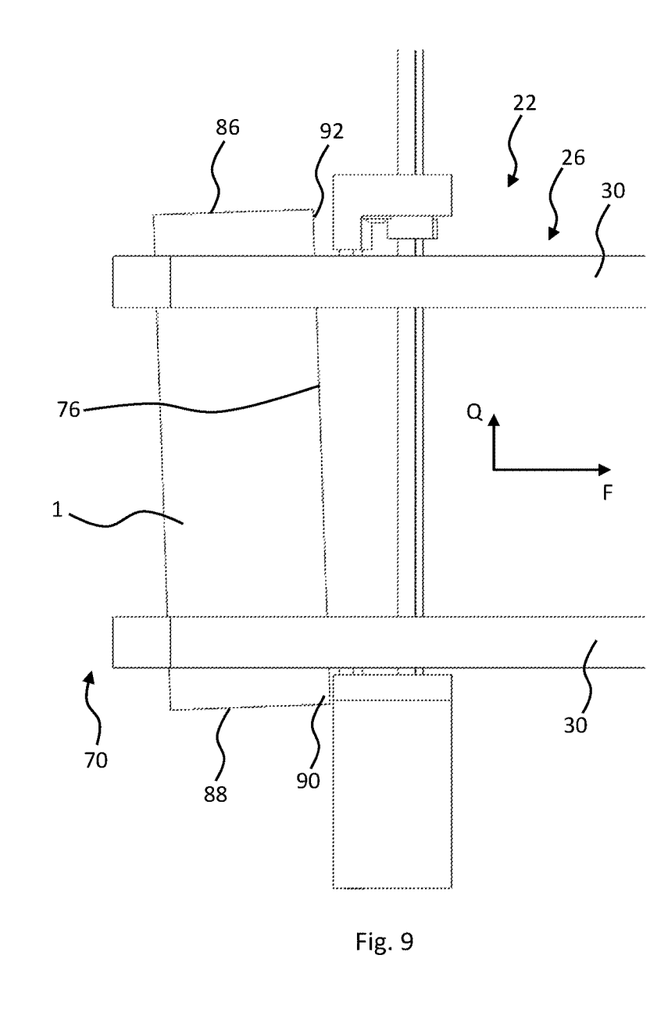
FIGS. 9-11 are top views of part of the device shown in FIG. 1 at different points in time during the method according to an aspect of the disclosure.
Figure 10:
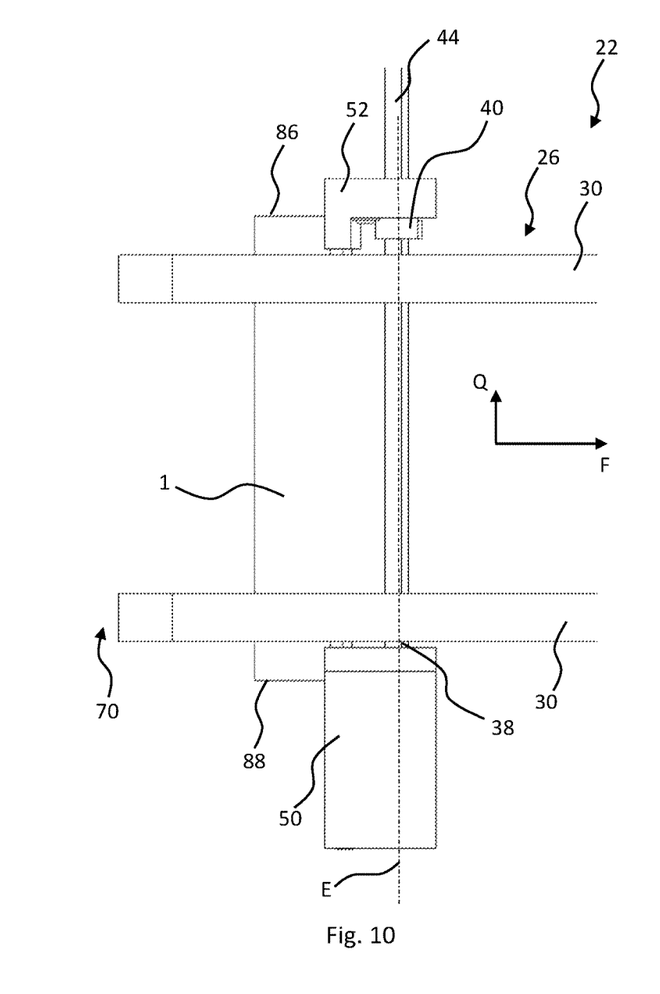
Figure 11:
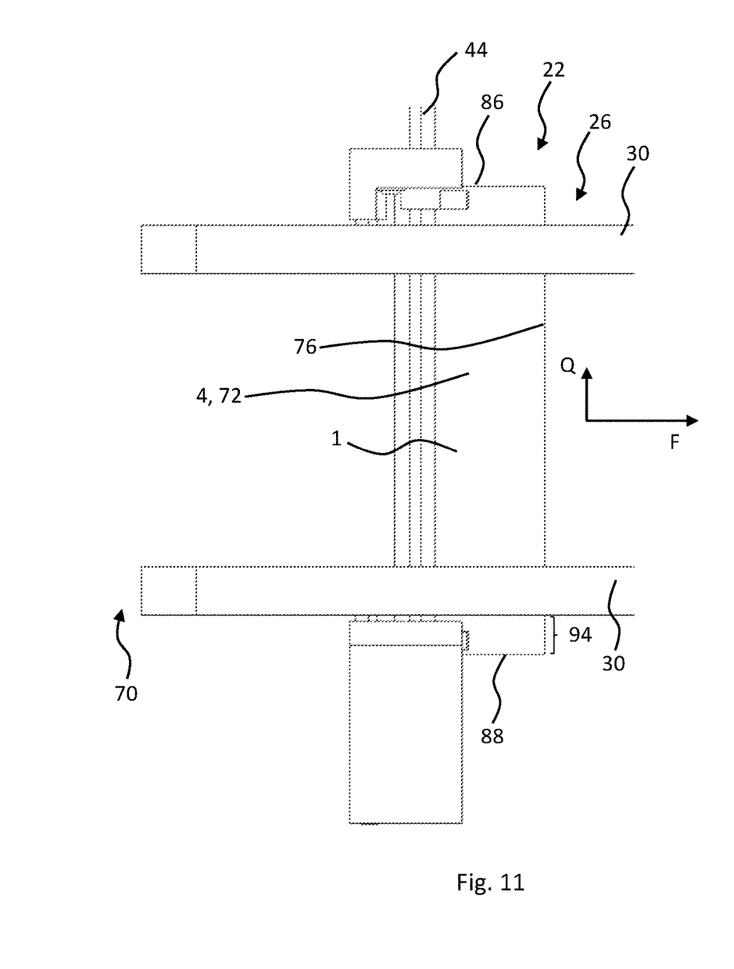

The method is illustrated in FIGS. 9-11 in the form of top views. The descriptions given with reference to FIGS. 6-8 apply substantially here too, except for the difference that the packaging box 1 is arranged here at a slant with respect to a transverse direction Q. The transverse direction Q in this exemplary embodiment is perpendicular to the conveying direction F and extends horizontally. The entire packaging box 1 can be arranged at a slant, in which case the leading surface 76 is perpendicular to the sides 86, 88 of the packaging box but at a slant to the transverse direction Q. It is also conceivable, however, that the packaging box 1 could be deformed in such a way that the leading surface 76 of the packaging box 1 is at a slant with respect to the transverse direction Q and with respect to the sides 86, 88 of the box. In addition to the slanted position shown in FIG. 9, the packaging box 1 could also be deformed in the way shown in FIG. 6.

It can be seen from FIGS. 9 and 10 that a right edge section 90 of the leading surface 76 of the packaging box 1 first contacts the third stop element 38 and the first stop element 34 located underneath it, both of these stop elements 34, 38 being in their first position. The right edge section 90 is therefore blocked by the first and third stop elements 34, 38 and cannot move any further in the conveying direction F in spite of the continuing movement of the conveying device 22 in the conveying direction F. Slippage thus occurs between the right one of each of the belts 30, 32 and the packaging box 1. Because of the continuing movement of the conveying device 22 in the conveying direction F, the left part of the packaging box 1 is conveyed further along in the conveying direction F until a left edge section 92 is resting against the fourth stop element 40 and the second stop element 36 underneath it, which two stop elements 40, 36 are also in their first position.

In analogy to the previous discussions, stop sites are also defined here between the stop elements 34, 36, 38, 40 on the one hand and the sections 90, 92 of the packaging box 1 facing these stop elements 34, 36, 38, 40 on the other hand. The stop sites also define a plane E, so that the leading surface 76 of the packaging box 1 is arranged in the plane E once each section 90, 92 of the package box 1 facing a stop element 34, 36, 38, 40 is resting against the respective stop element 34, 36, 38, 40. The packaging box 1 is then arranged in such a way that the leading surface 76 is perpendicular to both, the conveying direction F and to the sides 86, 88.

Once the packaging box 1 has been aligned, it is released by moving all of the stop elements 34, 36, 38, 40 simultaneously out of the first position and into the associated second position, as previously described. After it has been the released, the aligned packaging box 1 is carried further along in the conveying direction F by the conveying device 22, as shown in FIG. 11.

It can also be seen in FIG. 11 that the conveying device 22 receives and conveys the packaging box 1 further onward in such a way that areas of the packaging box 1 to which the identifier 2 can be applied are accessible. For example, the belts 30 of the first conveying unit 26 are so far apart in the transverse direction Q that an identifier, e.g. in the form of an adhesive label, an imprint, or a barcode can be applied to the first side 4, which forms the top 72 of the packaging box 1.

In addition or alternatively, the belts 30, 32 can be arranged at such a distance from the sides 86, 88 of the packaging box 1 that an adhesive label 2, as described on the basis of FIG. 1, can be applied to these sides and around an edge of the packaging box 1. There will then be a projection 94 of the packaging box 1 between a side 86, 88 and a corresponding outer edge of a belt 30, 32 closest to the side 86, 88. This projection 94 is large enough for a first section of the adhesive label 2 being applied to the first side 4 of the packaging box 1 forming the top 72. Then a second section of the adhesive label 2 is laid around the edge 8 of the packaging box 1 and applied to the side 88 of the box 1 forming the second side 6.

On the basis of the exemplary embodiments described in detail herein, the skilled person will be able to envision additional variations of the device according to the disclosure and of the method according to the disclosure. In particular, the stop elements, their arrangement, and their support can be varied in many different ways.

The invention claimed is:

1. A method for aligning rectangular packaging boxes, comprising the steps of:
   conveying packaging boxes along a transport path in a conveying direction by means of a conveying device, wherein the conveying device comprises a first conveying unit and a second conveying unit opposite the first conveying unit; wherein the first conveying unit and the second conveying unit define the transport path, wherein the first conveying unit and the second conveying unit each comprise at least one belt, and wherein the first and second conveying units receive and jointly convey the packaging boxes between them; and
   aligning each packaging box of the conveyed packaging boxes by means of at least one stop element, which is arranged in an area of the conveying device, wherein the step of aligning each packaging box comprises the steps of:
   arranging the at least one stop element in a first position, in which the at least one stop element is arranged stationary and projects into the transport path;
   conveying the packaging box against the at least one stop element, wherein the conveying device continues to move in the conveying direction relative to the at least one stop element and thus forces the packaging box against the at least one stop element, until each section of the packaging box facing the at least one stop element rests against the at least one stop element;
   moving the at least one stop element out of the first position and into a second position after each section of the packaging box facing the at least one stop element is resting against the at least one stop element, wherein the at least one stop element, when in the second position, does not project into the transport path, and thus releases the aligned packaging box for further transport in the conveying direction.

2. The method according to claim 1, wherein the at least one stop element comprises a plurality of stop elements, wherein the step of aligning each packaging box comprises aligning each packaging box of the conveyed packaging boxes by means of the plurality of stop elements, and wherein the step of moving the at least one stop element comprises moving the plurality of stop elements out of the first position and into the second position simultaneously.

3. The method according to claim 2, wherein stop sites of the plurality of stop elements, against which each packaging box comes to rest, define a plane, which is perpendicular to the conveying direction.

4. The method according to claim 2, wherein at least a first stop element and a second stop element of the plurality of stop elements are arranged on one side of the transport path, and at least a third stop element and a fourth stop element of the plurality of stop elements are arranged on a side of the transport path opposite the first and second stop elements in a direction transverse to the conveying direction.

5. The method according to claim 1, wherein the step of moving the at least one stop element out of the first position and into a second position comprises pivoting the at least one stop element around a pivot axis between the first and second positions.

6. The method according to claim 5, wherein a shaft is provided, which extends transversely to the conveying direction and defines the pivot axis, wherein the at least one stop element is arranged on the shaft.

7. The method according to claim 6, wherein the shaft is driven by means of a drive.

8. The method according to claim 1, wherein the first and second conveying units are synchronously and continuously driven.

9. The method according to claim 1, wherein the first conveying unit and the second conveying unit hold the packaging boxes between them by frictional contact.

10. The method according to claim 1, wherein the conveying device conveys the packaging boxes at a speed of at least 30 m/min.

11. The method according to claim 1, wherein the conveying device conveys the packaging boxes at a speed of at least 60 m/min.

12. The method according to claim 1, further comprising the step of applying an identifier to each packaging box after the packaging box has been aligned.

13. The method according to claim 12, wherein the identifier is an adhesive label, which is applied in such a way that it extends from a first side of the packaging box around an edge of the packaging box and onto a second side of the packaging box.

14. The method according to claim 1, wherein the step of arranging the at least one stop element in the first position comprises:
   detecting a packaging box approaching the at least one stop element by means of a sensor;
   transmitting a signal to a control unit when the sensor detects an approaching packaging box; and
   initiating the movement of the at least one stop element into the first position by means of the control unit when the control unit has received the signal;
   wherein moving the at least one stop element from the first position into the second position is initiated by the control unit as soon as a predetermined threshold is reached.

15. A device for aligning rectangular packaging boxes comprising:
   a conveying device, which comprises a first conveying unit and a second conveying unit opposite the first conveying unit, wherein the first conveying unit and the second conveying unit define a transport path of the packaging boxes and are configured to convey the packaging boxes along the transport path in a conveying direction, wherein the first conveying unit and the second conveying unit each comprise at least one belt and receive the packaging boxes between them;
   a plurality of stop elements, which are arranged in an area of the conveying device and which are movable between a first position and a second position, wherein the plurality of stop elements, when in the first position, are arranged stationary and project into the transport path and, when in the second position, do not project into the transport path;
   a first and a second shaft each defining a pivot axis, wherein the first shaft extends transversally to the conveying direction on one side of the transport path, and the second shaft extends transversally to the conveying direction on a side of the transport path opposite the first shaft;
   wherein at least one stop element of the plurality of stop elements is arranged on the first shaft, and at least another stop element of the plurality of stop elements is arranged on the second shaft; and
   wherein the plurality of stop elements are pivotable between the first and second positions.

16. The device according to claim 15, wherein the plurality of stop elements are coupled in such a way that the stop elements can be moved simultaneously out of theft first position and into their second position, and wherein stop sites of the plurality of stop elements, against which the packaging box comes to rest, define a plane, which is perpendicular to the conveying direction.

* * * * *